United States Patent [19]
Coverdill et al.

[11] Patent Number: 5,890,080
[45] Date of Patent: Mar. 30, 1999

[54] TRUCK WITH MONITORED AND RESETTABLE ELECTRONIC CONTROL UNITS

[75] Inventors: Cary N. Coverdill, Boring, Oreg.; Steven A. Wright, Charlotte, N.C.

[73] Assignee: Freightliner Corporation, Portland, Oreg.

[21] Appl. No.: 673,697

[22] Filed: Jun. 25, 1996

[51] Int. Cl.⁶ .......................... G06F 19/00; G01M 17/00
[52] U.S. Cl. .................................. 701/29; 701/33; 701/32
[58] Field of Search .................................. 701/29, 31, 32, 701/36, 50, 33; 340/459, 461, 462

[56] References Cited

U.S. PATENT DOCUMENTS

| | | | |
|---|---|---|---|
| 4,258,421 | 3/1981 | Juhasz et al. | 364/424 |
| 4,533,962 | 8/1985 | Decker et al. | 360/5 |
| 4,825,362 | 4/1989 | Minami et al. | 364/200 |
| 4,835,671 | 5/1989 | Sato et al. | 364/186 |
| 4,843,557 | 6/1989 | Ina et al. | 364/431.11 |
| 4,972,184 | 11/1990 | Go et al. | 340/825.25 |
| 5,173,856 | 12/1992 | Purnell et al. | 364/424.04 |
| 5,250,761 | 10/1993 | Koyanagi | 177/141 |
| 5,303,163 | 4/1994 | Ebaugh et al. | 364/550 |
| 5,345,384 | 9/1994 | Przybyla et al. | 364/424.04 |
| 5,365,436 | 11/1994 | Schaller et al. | 364/424.03 |
| 5,693,876 | 12/1997 | Ghitea, Jr. et al. | 73/114 |

OTHER PUBLICATIONS

*Owner's Manual Caterpillar Driver Information Display*, Caterpillar, Feb. 1995.
*ProDriver™ User Manual*, Detroit Diesel Corporation, Mar. 1994.
*CELECT RoadRelay™ User's Guide*, Cummins Cadec copyright 1993.

Primary Examiner—Michael Zanelli
Attorney, Agent, or Firm—Klarquist Sparkman Campbell Leigh & Whinston LLP

[57] ABSTRACT

A method for determining installed electronic devices on a truck and for providing a centralized reset to clear faults in the installed electronics. An instrumentation control unit in the cab of a truck determines installed electronics by requesting electronics on a shared data link to transmit data on the data link. The control unit identifies the installed devices from the transmitted data. Data describing the installed devices including manufacturer, model, and installed software can be obtained and displayed for diagnostic purposes. The instrumentation control unit provides a centralized reset for resetting the electronic devices on the data link.

15 Claims, 9 Drawing Sheets

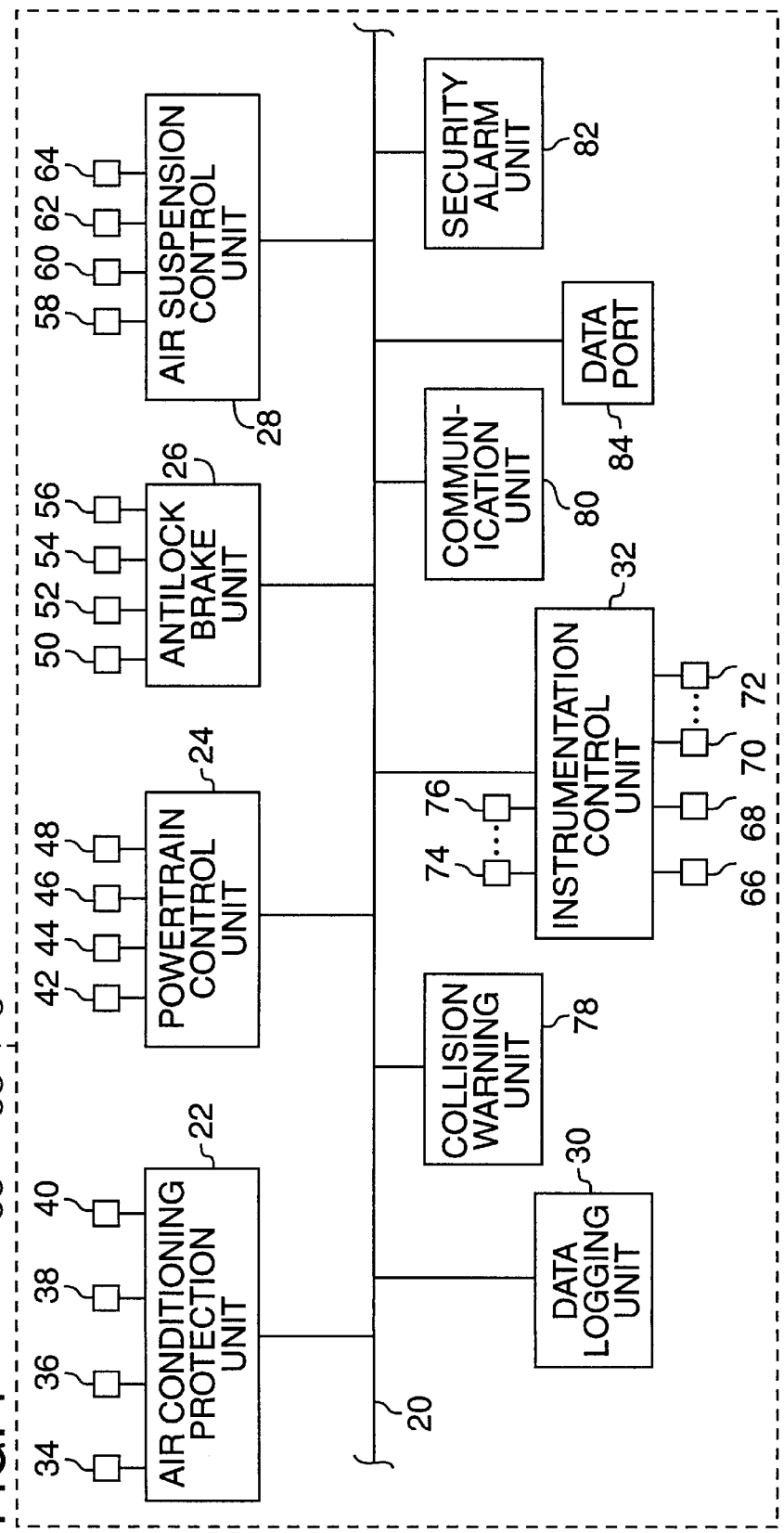
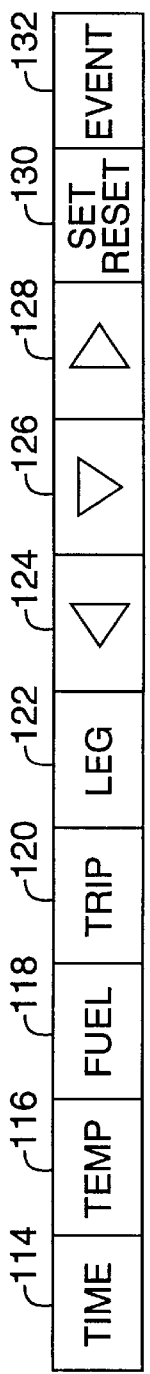
FIG. 1
FIG. 3

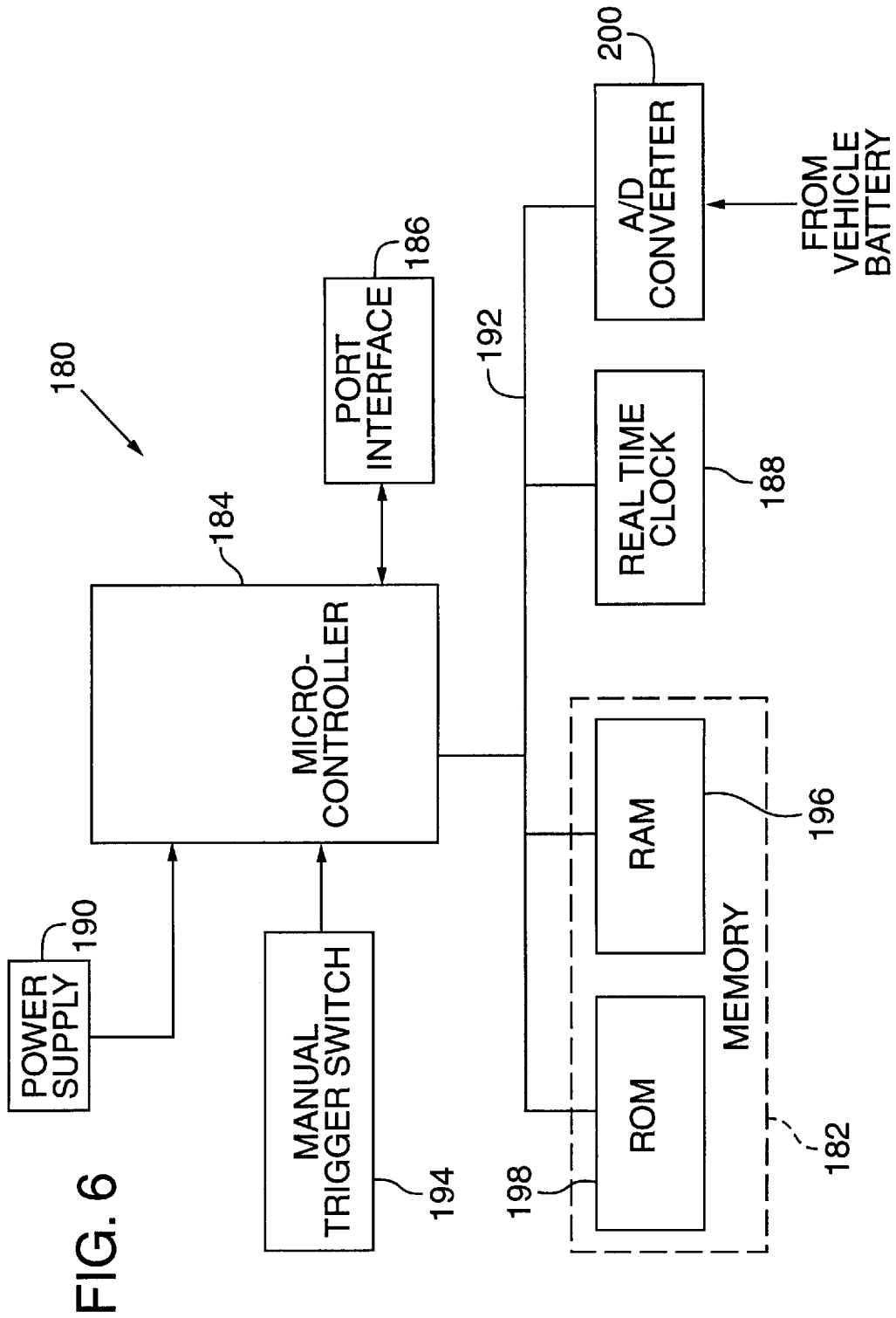

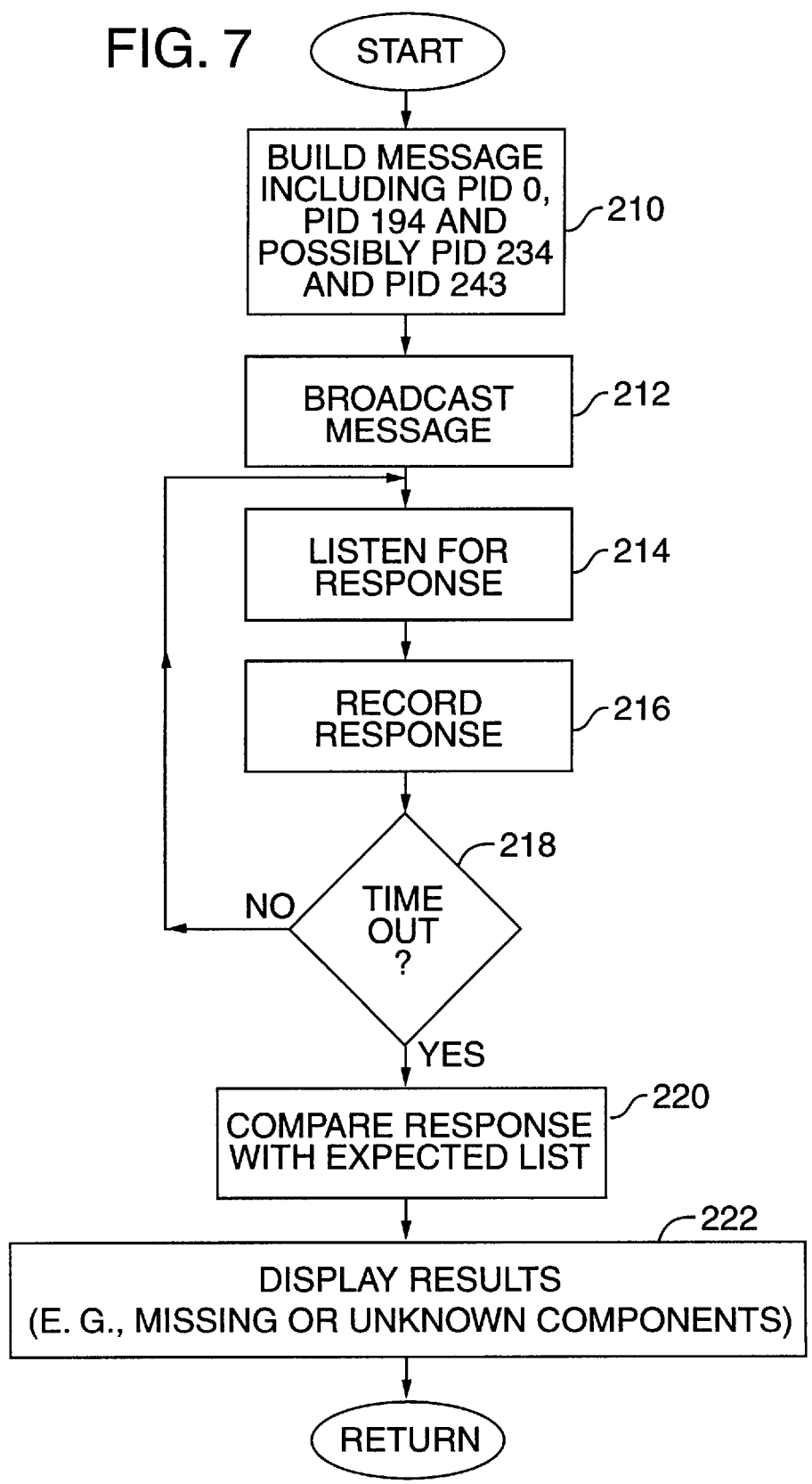

FIG. 8B

ECU with sensors

File  Functions  Help

| Instrument Cluster Unit | Data Logging Unit | AC Protection Unit | ECU Inventory |

Show:
○ ECU only  ● ECU with sensors

| ECU | Mfs | Model | Software Version |
|---|---|---|---|
| Engine #1 | CTRPL | 3406E | V1.0 |
| Engine #1 | SENSR | 3 | V0 |
| Transmission | FULLR | RTX-14715 | V1.0 |
| Instrument Cluster | PLLCK | ROADRUNNER | V1.8 |
| Instrument Cluster | SENSR | 8 | V0 |
| Instrument Cluster | SENSR | 3 | V0 |
| Instrument Cluster | SENSR | 4 | V0 |
| Instrument Cluster | SENSR | 5 | V0 |
| Instrument Cluster | SENSR | 7 | V0 |
| Instrument Cluster | SENSR | 9 | V0 |
| Instrument Cluster | SENSR | 10 | V0 |
| Instrument Cluster | SENSR | 12 | V0 |
| Instrument Cluster | SENSR | 13 | V0 |
| Instrument Cluster | SENSR | 14 | V0 |
| Instrument Cluster | SENSR | 15 | V0 |

Retreive FTL     Compatability Check

Databus | Connected | Active | View installed ECU devices | VIN: 1FUYDXYB2PP470000

10:45 AM

← 242
⎫
⎬ 244
⎭

5,890,080

TRUCK WITH MONITORED AND RESETTABLE ELECTRONIC CONTROL UNITS

TECHNICAL FIELD

The invention relates to a truck including systems for monitoring and resetting electronic control units mounted in the truck.

BACKGROUND OF THE INVENTION

Electronic controls are widely used in trucks for a variety of applications. For example, sophisticated electronic control devices including programmed microprocessors are commonly used to control antilock brake systems, powertrains, and transmissions. These electronic devices have provided new functionality, such as the antilock brake systems, and have improved performance of existing components. While electronics have significantly improved functionality and performance, they have also increased the complexity of trucks.

As the use of electronic systems in trucks has grown, a number of electronic control devices or units have been developed for specific applications. For example, engine manufacturers have designed special purpose computers for controlling and monitoring engine performance. Brake manufacturers have designed electronic control devices to control sophisticated antilock brake system. Still other manufacturers have developed control units for air suspension systems. Since each of these devices are designed for different purposes, they are not typically designed to work together or to communicate with each other.

With the increasing sophistication of truck electronics, a need arose to provide a means for communicating data from the disparate electronic control systems on board the vehicle. Two standards developed for communication between electronic devices in vehicles are SAE (Society of Automotive Engineers) J1708 and J1587. SAE J1708 defines the requirements of the hardware and basic protocol for communicating data between electronic control systems or units. SAE J1587 provides a common format for messages and data communicated between the electronic control systems.

Despite the adoption of these standards by many in the industry, they alone do not solve many problems associated with installing and servicing electronic devices on today's trucks. For example, the standards do not provide any mechanism for determining which components are installed, or for determining whether the installed components are compatible.

One problem associated with these electronic systems is ensuring that they function properly and that they are compatible. The truck manufacturer can build and test the electronics to make sure that they are operational. However, it is very common for others to modify the truck with after-market electronic parts which do not operate properly or are incompatible with other components. In these circumstances, it is likely that the truck will have a number of electronic components that have never been tested by the truck manufacturer.

The lack of proper installation of electronic controls is a major problem for truck manufactures and service providers. Studies show that in excess of 50% of electronic components returned are found to operate properly. As such, considerable time and money is wasted in addressing problems that could have been avoided had the electronics been installed and configured properly.

Another problem associated with electronic devices installed on trucks is that they can exhibit erroneous behavior if not properly reset before delivery to the customer. During the truck assembly process, an electronic control unit may be used in a manner that makes it think there is a problem or a "fault." For instance, it is common for an assembler to power up an electronic subsystem before installing it in a vehicle. In these circumstances, the subsystem usually generates a number of faults because all of its sensors are not yet installed and calibrated.

The faults generated during the assembly process can be a serious problem for customers and service technicians because they make it appear as if there are problems with the vehicle. It is imperative, therefore, that all of the faults be cleared from the truck's electronics at the truck manufacturing plant. This is often time consuming because it may involve entering a series of commands at a keypad just to reset or re-program a single device. In other cases, it may require a technician to connect a hand held diagnostic tool or computer to an electronic subsystem to separately reset electronic subsystems in the truck. Often the diagnostic tool or computer require considerable reconfiguration to take advantage of proprietary software from the vendor of the electronic subsystem.

SUMMARY OF THE INVENTION

In one aspect, the invention provides a method and apparatus for determining installed electronics on a truck. In another aspect, the invention provides an improved method for resetting the truck electronics.

In one specific embodiment of the invention, a truck is equipped with a number of electronic control units (ECUs) interconnected via a truck data link. The ECUs are instructed to transmit data via the truck data link. By analyzing this data, a computer coupled to the truck data link can identify the installed components. Further data about the model, manufacturer, and installed software can also be determined.

In this specific embodiment, the system architecture on the truck includes an ECU called the instrumentation control unit located in the cab of the truck. The instrumentation control unit or an external computer coupled to the data link can query the ECUs on the data link to determine which components are installed and to obtain more specific data about the installed components. For example in one method for determining installed components, the instrumentation control unit broadcasts a request for data transmission on the data link, and then monitors the responses from the installed components. The instrumentation control unit identifies the installed components from their responses and stores a list of the installed components. This list can be downloaded to an external computer using diagnostic software and can be displayed for use in analyzing the compatibility of the installed components.

The instrumentation control unit provides a convenient method for resetting the installed electronic control units on the vehicle. The user can access and display diagnostic data called "faults" via an input device coupled to the instrumentation control unit in the cab of the vehicle. In response to a command entered by the user, the instrumentation control unit instructs the electronic control units to clear their faults.

For example in one embodiment, the user issues a command from an input device coupled to the instrumentation control unit to clear faults. If the mileage or other vehicle parameter (e.g. engine hours, etc.) is within predetermined limits, such as below a predetermined mileage value, the instrumentation control unit interprets the command as a request to clear all faults throughout the vehicle. The faults may be automatically cleared if the vehicle parameter, preferably mileage, is below a threshold value. The instrumentation control unit broadcasts a message to the electronic control units on the data link instructing them to clear their faults. This feature enables a technician to clear all faults easily from a central location. No sophisticated diagnostic tools or special purpose software is necessary to reset a variety of devices on the data link.

Further features and advantages of the invention will become apparent with reference to the following detailed description and accompanying drawings.

BRIEF DESCRIPTION OF THE DRAWINGS

FIG. 1 is a block diagram illustrating the system architecture in an embodiment of the invention.

FIG. 3 is a diagram of a keypad used for input to the instrumentation control unit illustrated in FIG. 2.

FIG. 6 is block diagram illustrating the data logging unit in one embodiment of the invention.

FIG. 7 is a flow diagram illustrating an embodiment of a method for determining installed components on a truck.

FIGS. 8A and 8B are examples of screen displays used to identify installed electronic components and software on a truck.

DETAILED DESCRIPTION OF THE INVENTION

Figure 2:
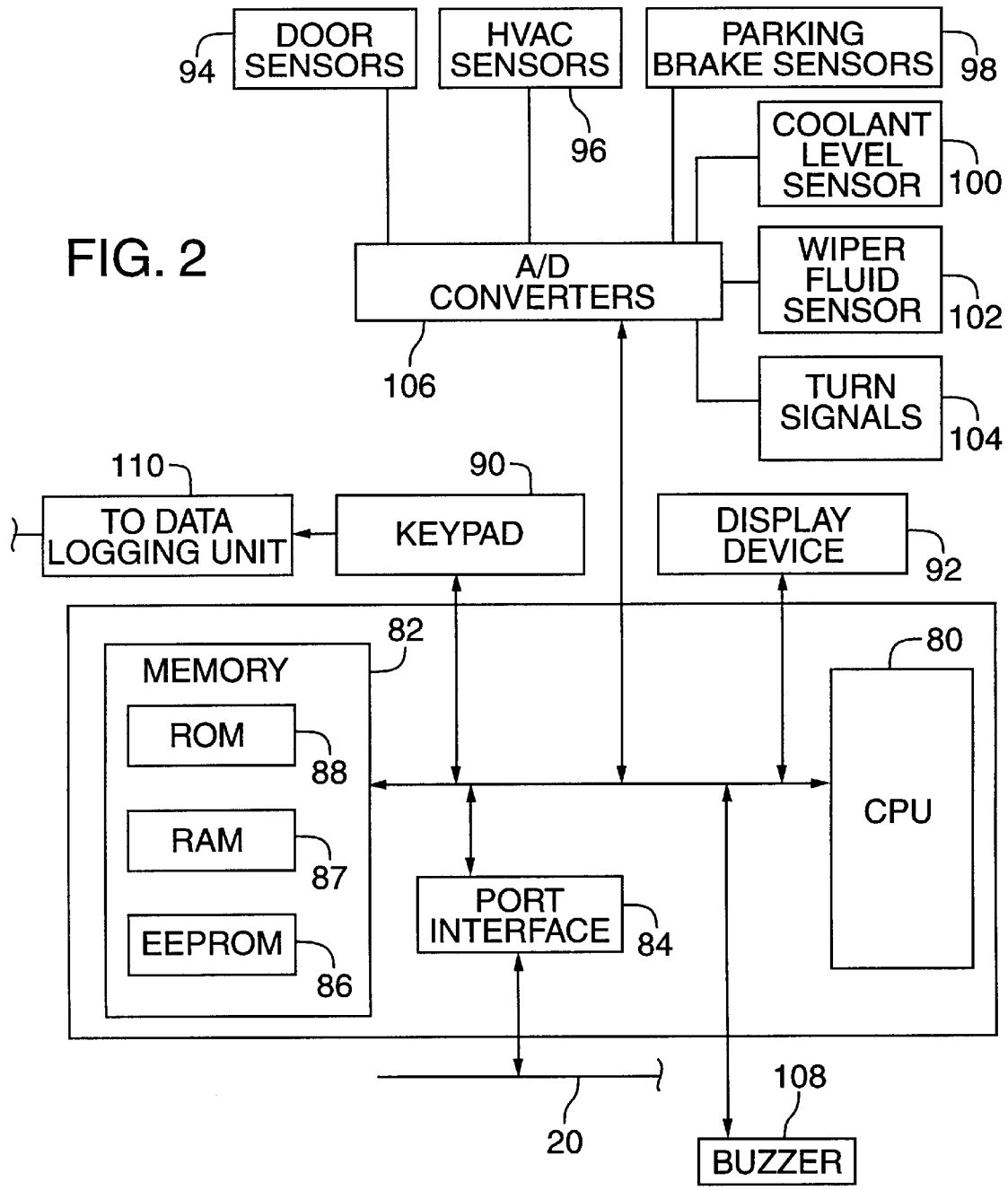
FIG. 2 is a block diagram illustrating the instrumentation control unit in an embodiment of the invention.

FIG. 1 is a block diagram illustrating the system architecture in an embodiment of the invention shown schematically on a truck 10. Truck 10 may be conventional with a cab, an engine, wheels, a drive train, brakes and other features commonly found on a truck. The system architecture on board the truck includes a number of electronic control units (ECU) coupled together with a data link 20.

In particular, the system includes an air conditioning protection unit 22, a powertrain control unit 24, an antilock brake unit 26, an air suspension control unit 28, a data logging unit 30, and an instrumentation control unit 32. The ECUs on the data link also typically have one or more sensors and actuators (34–76) used to monitor and control performance of the respective subsystems. These ECUs represent only one possible system configuration. The system can optionally include other ECUs including a collision warning unit 78, a communication unit 80, and a security alarm unit 82.

The ECUs on the data link are available from a variety of vendors. The powertrain control unit is typically provided by the engine manufacturer. Possible sources include Detroit Diesel Corporation of Detroit, Mich., Caterpillar Inc. of Mossville, Ill., or Cummins Engine Company of Columbus, Ind. The antilock brake unit is typically provided by the brake vendor such as Allied Signal Truck Brake Systems Co. (Bendix) Elyria, Ohio, or Rockwell-Wabco of Troy, Mich. The air conditioning protection unit is available from Index Sensors and Controls, Inc. of Redmond, Wash.

The communications unit is a device that supports remote communication with the truck. Typical forms of communication include satellite, cellular, short distance radio frequency, and infrared. These types of communication devices are available from Qualcomm of San Diego, Calif., Highway Master of Dallas, Tex., or Rockwell Transportation Electronics of Cedar Rapids, Iowa.

The collision warning unit is responsible for warning of possible collisions. It is available from Eaton-Vorad Technologies of San Diego, Calif.

The system architecture in FIG. 1 also includes a data port 84 for coupling external devices to the on-board data link. This data port 84 enables an external computer to receive and transmit messages on the data link. It also enables an external computer to establish a connection with an ECU on the network to either download data or retrieve data from memory in an ECU on the data link.

The data link 20, in this implementation, is a serial communication path connecting the ECUs together. This particular data link is designed according to SAE J1708, a standard for serial data communication between microcomputer systems in heavy duty vehicle applications. While this specific embodiment is based on the J1708 standard, it is not critical that the invention be implemented in this specific manner. One possible alternative is to use a data link constructed according to SAE J1939.

In one specific embodiment, the data link 20 is comprised of a twisted pair cable operating at 9600 baud. Designed according to the SAE J1708 standard, the data link forms a communication channel among electronic control units coupled to it. Electronic control units generate a digital signal on the data link by applying a voltage differential between the two wires in the cable. A voltage differential above a specified threshold represents a logic high value, while a voltage differential below a specified threshold represents a logic low value. This type of data link is particularly advantageous for hostile environments because the signal is more robust and impervious to signal degradation. However, other alternative communication media could be used in place of the J1708 cable.

The ECUs connected on the network communicate with each other according to protocols defined in SAE J1708 and SAE J1587. The SAE J1587 standard is entitled "Joint SAE/TMC Electronic Data Interchange Between Microcomputer Systems and Heavy Duty Vehicle Applications." This standard defines the format of data and messages communicated among microprocessors connected to a shared data link, and is specifically adapted for use with SAE J1708.

According to SAE J1708/J1587, the ECUs 22–32, 78–82 on the data link 20 communicate by passing messages to each other. The ECUs can be either receivers, or receivers and transmitters. In this particular implementation, the instrumentation control unit 32 is a transmitter and a receiver. It acts as a transmitter when requesting data from or resetting the ECUs on the data link 20, and acts as a receiver when listening for data transmitted from other ECUs.

A message in this format includes the following: 1) a module ID (MID), 2) one or more parameters, and 3) a checksum. The number of parameters in a message is limited by the total message length defined in the SAE J1708 standard. The module identification numbers are assigned to transmitter categories as identified in SAE J1587. The MID portion of a message specifies the origin or transmitter of the message. In the majority of cases, messages are broadcast on the data link without specifying a receiver. However, the message format can be extended to include the MID of a receiver after the MID of the transmitter for special applications.

The messages passed among the ECUs convey information by one or more parameters contained within them. According to the SAE J1587 standard, the first character of every parameter is a parameter identification character (PID). The parameter identified by the PID directly follows the PID. The SAE J1587 supports different data formats including a single character, a double data character or more than two data characters representing the parameter data. Several parameters can be packed into a message, limited in this specific example by the maximum message size as noted above.

In this implementation, the ECUs 22–32, 78–82 communicate with each other over the data link 20 according to the SAE standard J1708. The standard describes methods for accessing the data link and constructing messages for transfer over it. It also defines a method for resource contention among the ECUs on the data link.

An ECU wishing to transmit data on the data link first waits for a lull in transmission of data on the data link. In this particular implementation, the length of the lull is 200 milliseconds. After detecting this lull, the ECU attempts to transmit its message. The transmitter broadcasts its message onto the data link. Each of the ECUs that operate as receivers on the data link will receive the message. However, receivers only act on a message if programmed to do so.

In some cases two or more transmitters may attempt to broadcast a message at one time, giving rise to a collision. To resolve a conflict among transmitters, messages have a priority according to their message identifiers. The MIDs of higher priority transmitters have a greater number of bits set at a logic level one. When more than one message is broadcast at a time, the more dominant message takes priority over lesser dominant messages. Since a lower priority message is blocked by a higher priority message, the transmitter of the lower priority message waits and retransmits the message after another lull. An ECU on the data link will continue to attempt to send a message until it is successfully broadcast to the data link.

While this particular embodiment is implemented according to the SAE J1708 standard, this is only one example of the media that can comprise the data link 20. Other alternatives are possible as well. For example, the data link 20 can be implemented according to SAE J1939 as well.

FIG. 2 is a block diagram illustrating the instrumentation control unit (ICU) in an embodiment of the invention. As explained in further detail below, the ICU can be used to check electronic components installed on the truck. Although it may be located anywhere on the truck, the ICU is typically positioned in the truck cab for easy access, and most preferably at the dash of the truck. It can also be used to reset faults and "events."

The instrumentation control unit includes a CPU 80, memory 82 and a port interface 84 for connecting the unit to the data link 20. The memory includes programmable ROM (EEPROM) 86 and permanent ROM 88. The routines for controlling the ICU are stored in ROM 88, while configurable data such as a configuration file is stored in the EEPROM 86. The memory 82 also includes a form of volatile memory such as RAM 87 for temporary storage of program instructions and data.

In one specific implementation, the ICU has two CPUs and its memory includes EEPROM, ROM, and RAM. The CPUs are 68HC11 microprocessors from Motorola Corporation. A first CPU controls the operation of the message display system and executes routines to determine installed components and to clear faults of ECUs on the data link and stored events in the data logging unit. The second CPU controls dash instrumentation integrated with the ICU. The second CPU is not critical to the invention but is mentioned here to be complete. This specific ICU has 8 KB of external EEPROM, 128K of ROM and 2K of RAM. The internal memory of the CPU comprises 256 Bytes of RAM and 512 bytes of EEPROM. This is only one specific implementation of the ICU. A variety of conventional processors and memory systems can be used to implement the functionality of the instrumentation control unit.

The ICU also includes an input device 90 and a display device 92. In this implementation, the input device 90 is a ten key keypad. The display device 92 presents a two-line display, sometimes referred to as the "message center." In one implementation, the display device comprises a two by 20 character vacuum fluorescent (VF) display. Alternative implementations are also possible such as a liquid crystal display (LCD) or other display device.

The ICU in FIG. 2 is connected to a number of sensors (94–104) through analog to digital converters 106. For example, the ICU in this implementation is coupled to: door sensors (94) for detecting when the cab doors are open or closed; HVAC sensors (96) for determining whether fresh air is circulating in the cab; parking brake controls (98) for sensing whether the parking brakes are applied; a coolant level sensor (100) for detecting when the coolant level drops below a specified level; wiper fluid sensors (102) for determining when the wiper fluid drops below a specified level; and turn signal controls (104) which indicate when a turn signal is applied.

The specific sensors used in this embodiment are not critical to the invention. These sensors are illustrated to demonstrate that ECUs can include a variety of sensors and/or actuators. During installation or repair, sensors such as these can generate faults in their respective ECUs. These types of faults need to be cleared to ensure that the data management system on board the vehicle is operating properly.

The ICU can also include a buzzer 108 used to notify the driver when certain warning conditions are detected. Typical examples of these warning conditions include "cab door open," "parking brake applied and vehicle in motion," "coolant level low," etc. In this implementation, the buzzer is integrated into the ICU. However, a buzzer or other audio transducer can be implemented as a discrete device to the ICU.

The particular ICU used in this implementation is manufactured by Joseph Pollak of Boston, Mass. for Freightliner Corporation. The instrumentation control unit is presently available as a replacement part from Freightliner Corporation.

FIG. 3 is a diagram of one implementation of the keypad. The illustrated keypad includes the following dedicated keys:

| | |
|---|---|
| 1. Time | (114) |
| 2. Temperature | (116) |
| 3. Fuel | (118) |
| 4. Trip Miles and Hours | (120) |
| 5. Leg Miles and Hours | (122) |

The keypad also includes the following general purpose keys:

| | |
|---|---|
| 1. Left Arrow Key | (124) |
| 2. Down Arrow Key | (126) |
| 3. Right Arrow Key | (128) |
| 4. Set/Reset Key | (130) |

The keypad includes an event key 132 which enables the driver to specify that an event or problem has occurred with the vehicle. For example, if the driver is experiencing problems with the transmission, he or she can depress the event key to record the transmission problem. In response, the data logging unit 30 receives an interrupt signal from the keypad 90 of the ICU and creates an event file. In this implementation, there is a discrete connection 110 from the keypad 90 to the data logging unit 30. In addition, the ICU can send a message to the data logging unit over the data link 20 to notify it that the driver or other user has triggered a manual event at the keypad 90.

As explained in further detail below, the keypad on the ICU can be used in conjunction with diagnostic display screens to clear faults and events from a central location.

Figure 4:
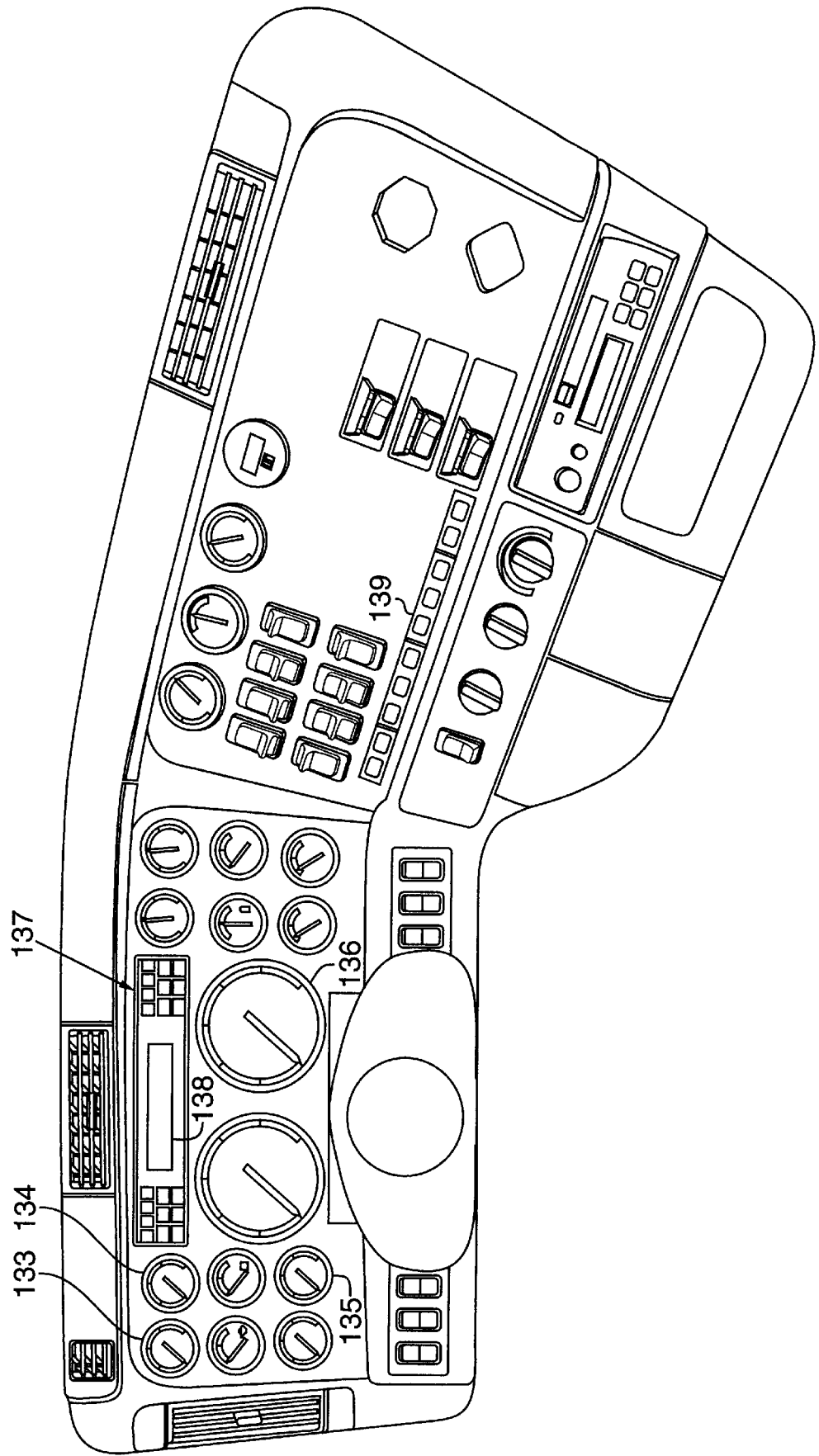
FIG. 4 is diagram of the layout of a dash in a truck, showing the keypad and display of the instrumentation control unit of FIG. 2.

FIG. 4 is a diagram illustrating the layout of the dash in one embodiment. The dash includes a variety of gauges (133–136, for example) and indicator lights (137, for example). The display device 138 of the ICU is positioned in front of the driver as shown. The keypad 139 of the ICU is positioned to the right of the display, within reach of the driver. This layout illustrates only one possible layout of the dash and many other variations are possible.

Figure 5:
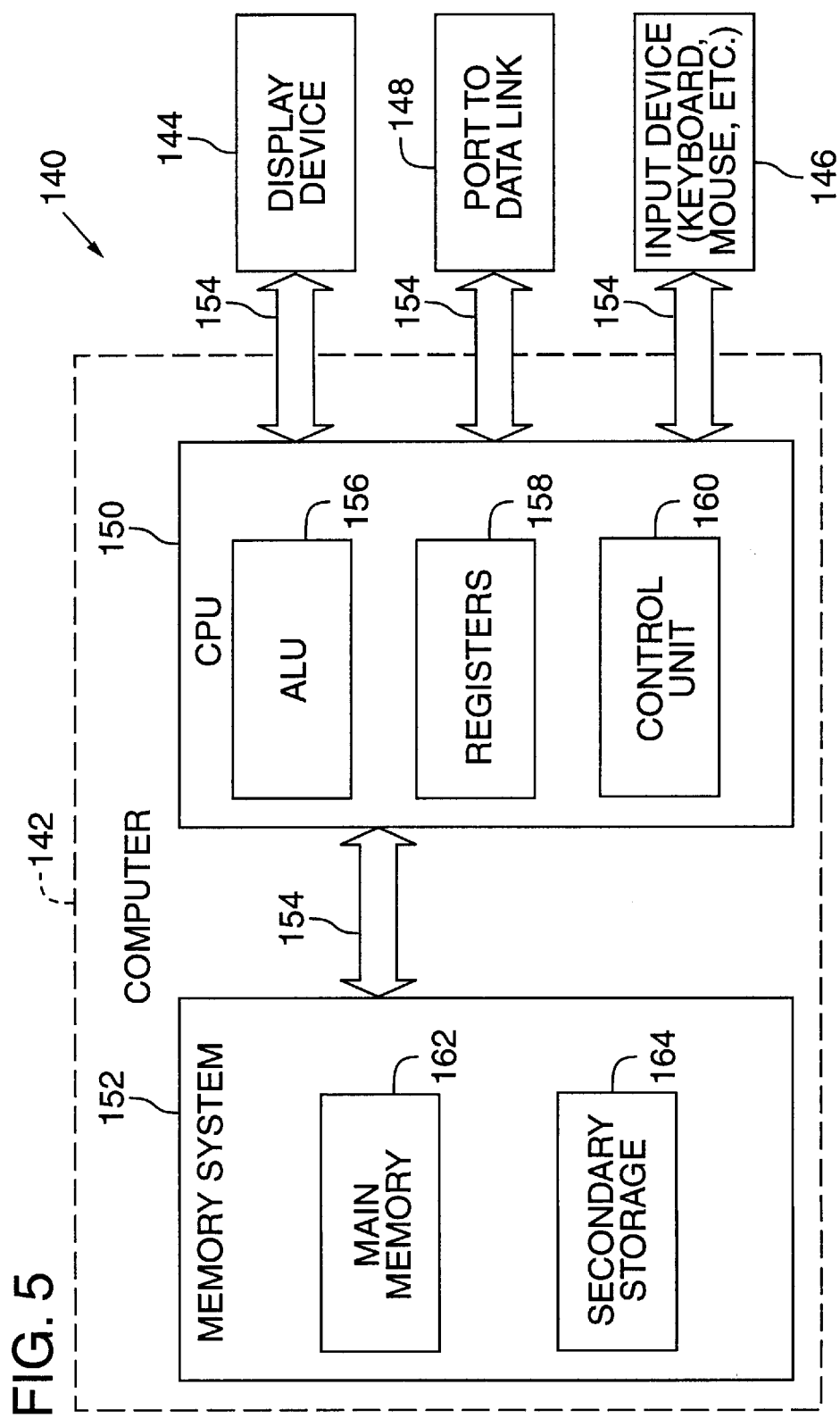
FIG. 5 is a block diagram illustrating an external computer coupled to the on-board data processing system.

FIG. 5 is a block diagram illustrating an external computer system coupled to the on-board data processing system. Service technicians or other users can use an external computer coupled to the data link to analyze the electronics and software on board the truck. In one implementation, the external computer is an IBM-compatible PC, equipped with the Windows Operating System from Microsoft Corporation and ServiceLink diagnostic software from Freightliner Corporation. ServiceLink is one example of an application program used to communicate with ECUs (e.g., the data logging unit and ICU) on a SAE J1587 data link. Other software applications such as JTools and JPro from Parasoft Computing Solutions (Winston-Salem, N.C.) also can be used to communicate with an ECU on a J1587 data link. A variety of alternative computers and computer architectures are also possible as evidenced by the general nature of the computer architecture shown in FIG. 5.

The computer system 140 includes as its basic elements a computer 142, a display device 144, an input device 146, and serial communication link 148 to the data port 84 on the data link 20.

The external computer 142 generally includes at least one high speed processing unit (CPU) 150 and a memory system 152 that communicate through a bus structure 154. CPU 150 includes an arithmetic logic unit (ALU) 156 for performing computations, registers 158 for temporary storage of data and instructions and a control unit 160 for controlling the operation of computer system 140 in response to instructions from a computer program such as an application or an operating system. Any of a variety of processors, including those from Digital Equipment, Sun, IBM, Motorola, NEC, Intel, Cyrix, AMD, and Nexgen can be used as the CPU 150. Although shown with one CPU 150, computer system 140 may alternatively include multiple processing units.

Memory system 152 generally includes high-speed main memory 162 in the form of a medium such as random access memory (RAM) and read only memory (ROM) semiconductor devices and secondary storage 164 in the form of a medium such as floppy disks, hard disks, tape, CD-ROM, etc. and other devices that use electrical, magnetic, optical or other recording material. Main memory 162 stores programs such as a computer's operating system and currently running application programs. Main memory 162 also includes video display memory for displaying images through a display device.

Input device 146 and the port 148 to the data link 20 are peripheral devices connected by bus structure 154 to computer 142. Input device 146 may be a keyboard, a pointing device such as a mouse, a pen, or other device for providing input data to the computer.

It should be understood that FIG. 5 is a block diagram illustrating the basic elements of a computer system; the figure is not intended to illustrate a specific architecture for a computer system 140. For example, no particular bus structure is shown because various bus structures known in the field of computer design may be used to interconnect the elements of the computer system in a number of ways, as desired. CPU 150 may be comprised of a discrete ALU 156, registers 158 and control unit 160 or may be a single device in which one or more of these parts of the CPU are integrated together, such as in a microprocessor.

Moreover, the number and arrangement of the elements of the computer system may be varied from what is shown and described in ways known in the art.

An external computer 140, such as a PC, communicates with the data link 20 on board the truck through the data port 84 (FIG. 1). As noted above, the data link 20 can be implemented according to the SAE standards J1708/J1587. In this case, the external computer communicates with the ECUs on the data link according to the J1587 and J1708 protocols.

FIG. 6 is block diagram illustrating the data logging unit in one embodiment of the invention. The data logging unit monitors and records faults and events. It is relevant to the method for resetting electronic control units on the data link because, like the other ECUs on the data link, it may need to be reset, for example, before delivery of the truck. Events triggered in the data logging unit, such as the manually triggered event from the keypad 90 of the ICU 32 may need to be cleared. One significant example is when events pertaining to the data logging unit are inadvertently generated during the assembly process. In this circumstance, it is desirable to clear the events before delivery of the vehicle. The ICU enables a user to clear faults and events in the data logging unit conveniently from the dash of the truck.

The data logging unit 180 generally includes memory 182, a microcontroller 184, an interface 186 to the data link, a real time clock 188, and a power supply 190. The memory 182 and the real time clock are coupled to the microcontroller 184 via a bus 192.

In this implementation, the power supply includes a control chip that supplies power to the microcontroller from either the vehicle battery or a lithium battery. The lithium battery serves as a back-up in the event that the voltage supplied from the battery is insufficient or unavailable.

As noted above, the data logging unit is coupled to the keypad 90 of the ICU (FIG. 2) to receive an interrupt when a user actuates the event key on the keypad. This connection is represented by the manual trigger switch 194 shown in FIG. 6. The data logging unit can also receive interrupts from other devices as well.

The memory 182 of the data includes both RAM 196 and ROM 198. This implementation includes 128 KB of ROM, which stores the application code executed by the microcontroller. This executable code includes the set-up routines used to boot the data logging unit and the data logging routines used to monitor predefined events. This implementation also includes 256KB of battery-backed RAM, which is used to implement a FIFO buffer for capturing data from the data link and to store event files.

In this implementation, the data logging unit monitors voltage supplied by the vehicle battery through an analog to digital converter 200, which converts the 12 volt signal from the battery to a digital signal compatible with the microcontroller 184.

The real time clock 188 is used to track time in the truck. While recording event data, the data logging unit time stamps data with the time kept by the real time clock. In this implementation, the data logging unit is the centralized time keeper for the ECUs on the data link. Thus, it serves as a common time reference for faults and events that occur in the system.

The data logging unit performs a data monitoring function. Coupled to the data link, the data logging unit listens for periodic data messages broadcast over the data link. The data link continuously records a snapshot of data from the data link into the FIFO buffer. In this implementation, the data logging unit is programmed to continuously store the most recent 60 seconds of data from the data link. Some examples of the data monitored by the data logging unit are set forth below. The name of the parameter is followed by the parameter identification number (PID) as set forth in the SAE J1587 standard.

Vehicle Road Speed; PID 84
Percent Throttle; PID 91
Percent Engine Load; PID 92
Output Torque; PID 93
Engine Oil Pressure; PID 100
Turbo Boost Pressure; PID 102
Coolant Temperature; PID 110
Engine Speed (RPM); PID 190

For some types of data, the data logging unit captures a new instance or slice of data once every second and stores it in the buffer. When the buffer is full, the most recent second of data overwrites the oldest snapshot of data.

In addition to continuously storing the data listed above, the data logging unit also monitors predefined events. These events can be defined by a PID broadcast on the data link, or by a discrete signal (such as an interrupt) received at the data logging unit. When one of the predefined events occurs, the data logging unit stores the last 60 seconds worth of data to memory and begins storing the next 60 seconds worth of data. In total, in this example, the amount of data stored for an event includes two minutes and one second worth of data. This data is recorded in an event file in memory. An external computer can be coupled to the data link to extract one or more event files from the data logging unit.

The data logging unit is programmed to respond to a request for data from the ICU or other computer on the data link such as an external computer. This functionality enables the ICU or external computer to verify that the data logging unit is installed properly and is compatible with other devices on the data link. The data logging unit can also be programmed to clear any faults or events it has generated. This is a useful feature that enables the data logging unit to be reset from another device on the datalink. Below we describe how the ICU or an external computer can be used to determine installed components on the data link. We also describe how the ICU can be used to reset the truck's electronics and clear stored events in the data logging unit.

Installation of Electronics

In a typical case, the manufacturing process proceeds as follows. In processing an order for a new truck, the mainframe computer at the manufacturing plant generates a detailed truck specification. The creation of the specification triggers a number of manufacturing processes necessary to build the truck according to the specification. Before delivery of the finished truck, a list of electronic components installed on the truck is prepared. This list is configured into a file format compatible with the ICU on board the truck. From an external computer, the component list is downloaded into the memory of the ICU. Later, the electronics on the truck are sometimes modified, making them incompatible. As a result, the electronic devices listed in the configuration file may not be consistent with the electronic devices actually installed on the vehicle. To diagnose these compatibility problems, it is necessary to determine whether the electronics have been modified and to determine which version of hardware and software is stored on the vehicle.

In this implementation, the installed components can be determined from: 1) the ICU or other ECU on the data link; or 2) an external computer (FIG. 5) coupled to the data link 20 via the data port 84. In the first case, the ICU (or other on-board ECU) polls the components on the truck to determine which ones are present. In the second case, the external computer polls the components on the truck through the data port and records the response.

An external computer can be used to download a configuration file to the ICU including a list of electronic components and possibly software installed in the truck. This list can be updated from time to time and can be transferred from memory of the ICU to the external computer. In this implementation, configuration files can be transferred between memory of the ICU and an external computer over the data link using the SAE J1587/J1708 protocols.

In one implementation, the ICU determines installed components on the truck by broadcasting a message requesting information from each of the components on the data link, and then examining the response. To implement this functionality, the ICU uses the following parameters set forth in SAE J1587:

PID 0 - Request Parameter Used to request parameter data transmission from other components on the data link.
Parameter Data Length: 1 Character
Data Type: Unsigned Short Integer
Resolution: Binary
Maximum Range: 0 to 255
Transmission Update Period: As needed
Message Priority: 8
Format: PID Data 0 a
  a Parameter ID of the requested parameter
PID 194 - Transmitter System Diagnostic Code and Occurrence Count Table
Parameter Data Length: Variable
Data Type: Binary Bit-Mapped
Resolution: Binary
Maximum Range: 0 to 255
Transmission Update Period: The diagnostic code is transmitted once whenever the fault becomes active and once whenever the fault becomes inactive but never more than once per second. All diagnostic codes are also available on request. All active diagnostic codes are retransmitted at a rate greater than or equal to the refresh rate of the associated PID but not greater -continued than once per second. Active diagnostic codes for on-request PIDs and SIDs are transmitted at a rate of once every 15 seconds.

Message Priority: 8
Format:  PID  Data 194  n a b c a b c a b c a b c a b c ...
n    Byte count of data that follows this character. This excludes characters MID, PID 194, and n but includes a, b and c type characters.
a    SID or PID of a standard diagnostic code.
b    Diagnostic code character.
     Bit 8:    Occurrence Count included
               1 = count is included
               0 = count not included
     Bit 7:    Current Status of fault
               1 = fault is inactive
               0 = fault is active
     Bit 6:    Type of diagnostic code
               1 = standard diagnostic code
               0 = expansion diagnostic code PID (PID from page 2)
     Bit 5:    Low character identifier for a standard diagnostic code
               1 = low character is subsystem identifier (SID)
               0 = low character is parameter identifier (PID)
     Bits 4–1: Failure mode identifier (FMI) of a standard diagnostic code
c    Occurrence count for the diagnostic code defined by the preceding 2 characters. The count is optional and bit 8 of the first character of the diagnostic code is used to determine if it is included.

In some cases, it may be helpful to determine additional information about the software installed on the ECUs on the data link. PID 234 may be used to obtain additional information regarding software installed on the vehicle.

PID 234 - Software Identification

Parameter Data Length: Variable
Data Type: Alphanumeric
Bit Resolution: ASCII
Maximum Range: 0 to 255 (each character)
Transmission Update Period: On request
Message Priority: 8
Format:  PID  Data 234  n a a a [b c c c . . .]
n    Number of parameter data characters
a    Software identification field
b    Optional delimiter: ASCII "*"
c    Optional additional software identification field The software identification field is variable in length and may contain more than one software identification designator. An ASCII "*" is used as a delimiter to separate multiple software identifications when required. If only one software identification field is contained in the parameter, the delimiter is not required. Additional software identification fields may be added at the end, each separated by an ASCII "*" as a delimiter. If the software identification for a particular product exceeds 18 bytes then PID 192 shall be used to section this parameter.

For information about the make, model and serial number of the components installed on the truck, PID 243 may also be included in the message broadcast to the components on the data link.

PID 243 - Component Identification Parameter

Parameter Data Length: Variable
Data Type: Alphanumeric
Resolution: ASCII
Maximum Range: 0 to 255 (each character)
Transmission Update Period: On request
Message Priority: 8
Format:  PID  Data 243  n b c c c c c * d d d d d d d d d * e e e e e e e e e
n    Number of parameter data characters following this byte
b    MID of component being identified
c    Characters specifying component Make
d    Characters specifying component Model
e    Characters specifying component Serial Number The data returned in response to a request for PID 234 and PID 243 can be further improved if provided in the following format:

Format:  MMMMM*IIII*T*X*HH.SSS.RRR

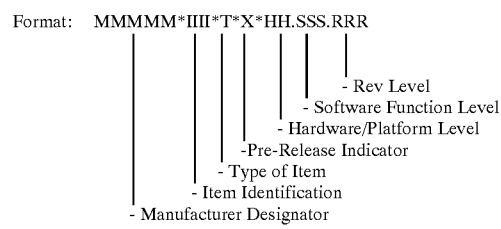

where the above fields are defined as follows:

Manufacturer Designator:  Five Alpha characters providing ATA/VMRS code, or a pseudo code for non-vehicle manufacturers.
    Example:   RCKSST = Rockwell, DTDSC = Detroit Diesel, FRGHT = Freightliner, CMMNS = Cummins Engine
Item Identification:   Four Alpha characters to define the item.
    Example:   _DL = Data logger, _CIC = Century Class Cluster, _ACP + A/C Protection, _SL = ServiceLink (note: see attached list for UNIT designators)
Type of Item:          Single Alpha character to designate kind of item
    Example:   U = Unit, L = DLL, E = EXE, A = API
Pre-Release Indicator: An 'X' in this field indicates item is NOT Released
Hardware/Platform:     Double Alpha Numeric character indicates Hardware release and change level, or target platform
Software Function Level: Triple Numeric field identifying function set included in software The following are some possible examples:

Freightliner Century Class ™ Instrument Cluster (released) H/W level 5, S/W level 10, rev 2
    Codes as: FRGHT*_CIC*U*_*5–.010.002
Data logger, released, Hardware level 2, revision level b, S/W level 3, rev 6
    Codes as: FRGHT*_DL*U*_*2b.003.006
Rockwell Data logger DLL, released, version 4, no revision history
    Codes as: RCKST*_DL*L_*0–.004.00
(note: if a DLL required a specific H/W target, it could be designated in the H field, i.e.: 01 = Pentium, 02 = Fieldworks, 03 = 386)
Detroit Diesel VEPS EXE, released, version 8
    Codes as: DTDSC*_EC*E*_*0–.008.000
ServiceLink API, released, version 2, rev 4
    Codes as: FRGHT*_SL*A*_*0–.002.004
    As configured, the M, I, T, X, and H fields can be used in SAE J1587 PID 243 (Component (ID) intact, with the unit serial number being appended to the end of the string where appropriate and necessary.

-continued

Delimiters (*) should only appear between the VMRS code, and the model fields (I, T, X, H). Ex: FRGHT*_DL.U.X.2b*(serial#)
Fields X, H, S, and R should be used for SAE J1587 PID 234 (Software ID). No delimiters should be used within this PID.
EX: X.2b.003.006

FIG. 7 is a flow diagram illustrating an embodiment of a method for determining installed components on a truck. This method may be executed by an on-board ECU such as the ICU or by an external computer connected to the data link via the data port. In the first step, a message is constructed including PID 0 and PID 194. As defined above, PID 0 is a parameter used to request parameter data transmission from other components on the data link. The first part of the message is the MID of the transmitting device. In the case where the ICU is transmitting the message on the data link, the MID identifies the ICU as the transmitting device. Similarly, in cases where an external device is transmitting the message on the data link, the MID identifies this external device. After the MID, the message includes PID 0, which instructs the devices coupled to the data link to transmit one or more parameters identified in the message.

Following PID 0, the message includes one or more PIDs identifying requested parameters. In one implementation where the ICU broadcasts the message, the message includes at least PID 194, and may also include request for PIDs 234 and 243. In another implementation where the external computer broadcasts the message, additional PIDs are included to obtain more information about the installed components. Specifically, the message includes PID 234 and 243 in addition to PID 194. It should be noted that these specific requests for parameters are not necessary to implement the invention. The requesting device can detect an installed device from the MID that it returns in a response message to a request for a parameter. PID 194 is useful because it gives fault information. PIDs 234 and 243 are useful because they provide additional information about installed software and make/model, respectively.

After building a message, the transmitting device (also referred to as the "polling" device) broadcasts the message to the components on the data link as shown in step 212. Each of the components on the data link that are operational should reply to this message. If a receiving device has no diagnostic codes to transmit, it returns PID 194 with the n parameter set to zero. If a receiving device has one or more faults however, it returns PID 194 with additional diagnostic codes providing additional information about a fault or faults in the device. In the SAE 1587 specification of PID 194, diagnostic data returned for PID 194 can include: 1) a subsystem identification number (SID) or a parameter identification number (PID) of a standard diagnostic code; 2) a diagnostic code character; and 3) an occurrence count for the diagnostic code. The specific structure of the diagnostic code characters is provided above in the referenced J1587 specification of PID 194.

To summarize briefly, the diagnostic code character includes a failure mode identifier (FMI) used to identify a standard diagnostic code, a bit indicating whether fault data is provided for a parameter identifier or a subsystem identifier, the status of the fault (active or inactive), and whether an occurrence count is included. The occurrence count specifies the number of times a particular fault has occurred.

For the purpose of determining the installed components, it is not critical whether the receiving devices on the data link return a zero or detailed diagnostic data in response to the request for PID 194. The device requesting this data, whether it is the ICU or an external computer, is looking for a response to determine which components are present on the data link. A response message from an ECU includes a MID, which the polling device can use to determine the installed components.

To obtain additional information about installed components, the polling device can also request information using PID 234 and 243. In response to a request for PID 234, a receiving device programmed to respond to this request will return a data string including a software identification field such as the one set forth above in the specification of PID 234. The software identification field is variable in length and may contain more than one software identification designator. If PID 243 is requested in the message broadcast to devices on the data link, a device programmed to respond to this message will return data specifying their make, model and serial number. The detailed SAE J1587 specification of parameter 243 is provided above.

A request for parameters 234 and 243 is particularly well-suited for service applications where the data is extracted from the on-board devices via an external computer. An external computer such as a PC has greater memory and processing capacity to store and display additional data about the devices on the data link for diagnostic purposes. An ECU on the data link such as the ICU for example can also be programmed to retrieve and possibly display this data as well.

After broadcasting the request for data as described above, the polling device listens for the response and records the data returned by the devices on the data link (214, 216). The polling device (e.g., the ICU, other on-board ECU, or an external computer) continues to listen for and record responses through its port interface for a predetermined period of time. At the end of this period (218), it stops listening for further messages.

In the process of determining installed components, the polling device can request a response from a specific device on the data link. For example, the transmitting device can request a response parameter or parameters from a specific component using a message designed according to the J1587 specification for PID 128. This type of message is similar to PID 0, but it also includes the MID of a particular component from which the parameter is requested. To poll for installed components using PID 128, a polling device sends a message for each component that it is trying to identify and specifies the MID of that component. The polling device can poll for one or more specific devices by transmitting a message including PID 128, the MID of the device, and the requested response parameter or parameters (e.g., 194, 234, 243, etc.) for each device.

Generally, a polling device can poll for components by making component-specific requests for parameters (e.g. PID 128), a non-specific request for parameters (e.g. PID 0), or some combination of both.

Using either a general or device specific request for parameters, the polling device compiles a list of the installed components by monitoring the data link for responses to its request(s) for parameter transmission, and then interpreting the responses. The polling device can also compile a list of missing components by making device specific requests, and keeping track of expected devices that do not respond. Alternatively, the polling device or possibly some other device using the results of the polling step can identify missing components by comparing a list of installed components with a list of expected components as explained further below.

The specific method for interpreting the responses depends, in part, on the method for requesting responses. If the polling device makes a request for parameters using PID 0 and PID 194, for example, it can identify installed components from the MIDs in the response messages. If the polling device makes a component specific request using PID 128, for example, it can determine whether the device having the specified MID is installed by receiving a response from it. The polling device can get more information about installed components than just the MID from additional requested data in the response message such as the installed software or the hardware make and model.

In one specific implementation, the ICU interprets the MID of the devices responding to a general request for parameter transmission and keeps a list of the installed components. The ICU compares the list of installed components with a list of the expected electronic control units (expected list) (220). The two lists are compared to identify any unknown or unexpected ECUs that have responded to the transmitting device and to determine whether any expected ECUs have not responded. The term, "unknown," in this context refers to an ECU or other responding electronic component on the data link that is not identified on the "expected" list.

In a typical case, the truck manufacturer generates the expected list of components based on the components that it has installed in the vehicle. The expected list can be stored on board the vehicle such as in a file in memory of the ICU or data logging unit, or it can be stored off the vehicle such as in a manufacture's or dealer's database along with a vehicle identification number.

The results of the polling and comparing steps can be displayed so that a user can view a description of the installed, missing or unknown components (222). For example in one possible implementation, the ICU displays ECU data identifying the unknown and missing ECUs. The external computer, executing an application such as ServiceLink from Freightliner Corp., can also display a list of installed, unknown or missing components.

There are a number of possible variations to this approach. For example, another ECU on the data link can compile the list of the installed components, and the ICU can read the list, compare it with expected components, and display information about the installed, missing or unknown components on the display device. Conversely, the ICU can store a list of the installed components and another device (such as the external computer) can retrieve it, compare it with an expected list, and display installed, missing or unknown components. The ICU or other polling device can also maintain a list of related information for the installed or unknown components such as the fault information from PID 194, software information from PID 234, and make and model information from PID 243. This related information can be used to convey more information about the installed components when displayed to a user, such as on the display of the ICU, or on a display screen or printout generated by an external computer coupled to the data link.

The method described above enables a device on the data link to determine which components are installed on board the truck. The information returned in response to a request for PIDs 234 and 243 enables a service technician to determine whether the components and software installed on the vehicle are compatible with each other.

Figure 8A:
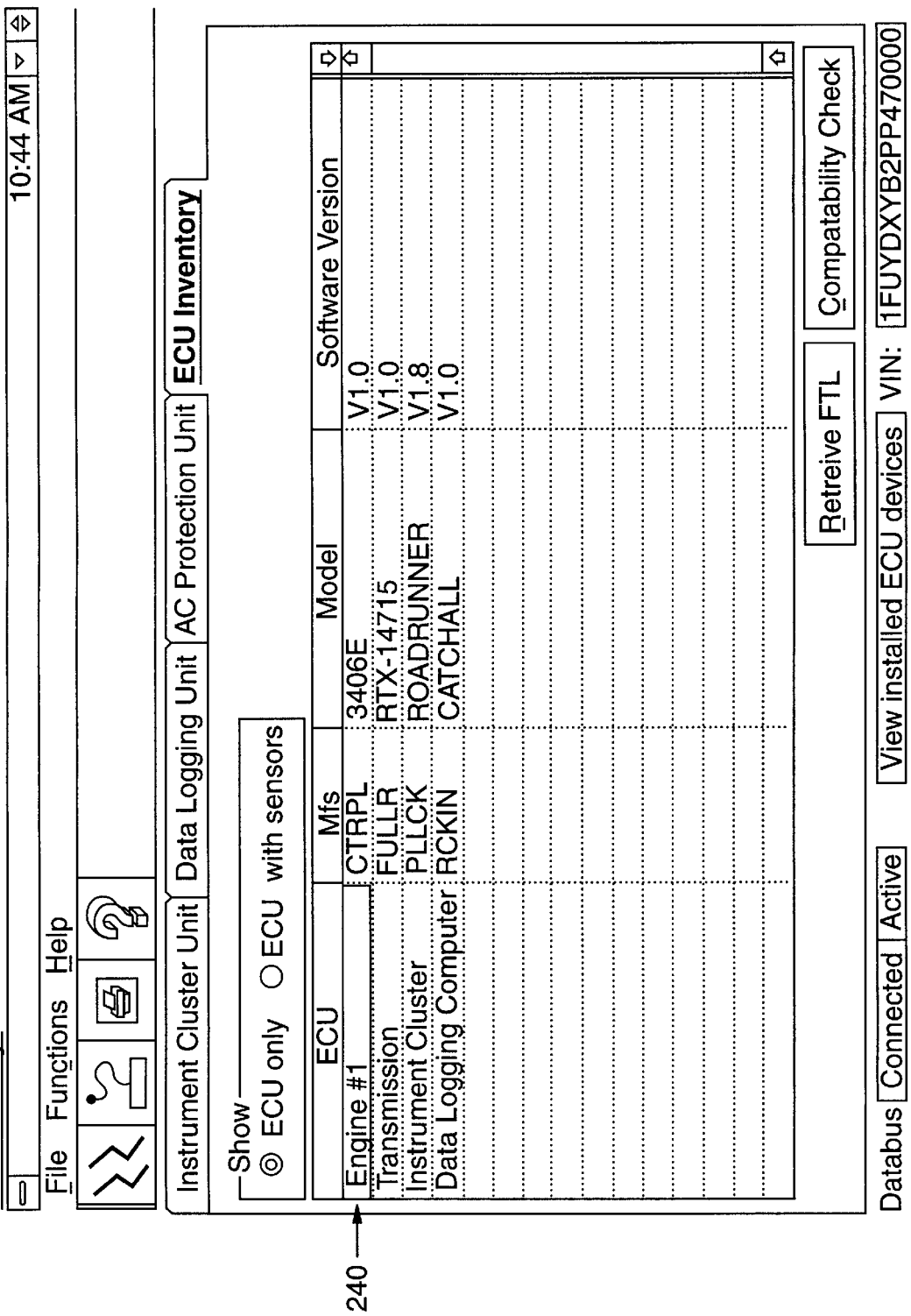

One particular program for retrieving and displaying diagnostic information from the data link is called ServiceLink from Freightliner Corporation. ServiceLink diagnostic software is a PC-based program used to retrieve diagnostic data from devices connected to the data link on board a truck. The ServiceLink diagnostic software communicates data to and from the vehicle. Specifically, it is capable of reading faults from ECUs on the data link. It can also retrieve event files from the data logging unit and also display data from this event file as well as faults from the ECUs on the data link. FIGS. 8A and 8B illustrate examples of display screens showing diagnostic information retrieved and displayed using the ServiceLink diagnostic software.

FIG. 8A is a screen diagram illustrating a list of ECUs and corresponding data describing the manufacturer, model, and software version. For example, the first row (240) lists the engine ECU, manufactured by Caterpillar (CTRPL). The model number is 3406E and the version of the software installed on the ECU is V1.0.

FIG. 8B is a similar diagram illustrating ECUs as well as the sensors coupled to the respective ECUs. As an example, consider the fourth row 242 of the table. The term "instrument cluster," refers to the ICU in this implementation. For this entry in the table, the screen display shows the manufacturer (PLLCK), the model ("ROADRUNNER"), and the software version number (v1.8). The table then lists a number of sensors (244) attached to the ICU.

Resetting Installed Systems

In addition to determining installed hardware and software on the truck, the invention also provides a method and system for resetting the installed devices. As noted above, a number of faults are typically generated during the assembly process. If these faults are not cleared before delivery to the customer, devices on board the truck can show faults even though they are installed properly and are compatible with other devices. In addition to clearing faults, it is also important to clear any events that have been recorded prior to delivery. For example, in one implementation, a data logging unit on board the truck may have recorded one or more events triggered during the assembly or testing process of the vehicle at the manufacturing plant.

In one embodiment, the instrumentation control unit provides a method for clearing faults in the ECUs on the data link as well as resetting events recorded in the data logging unit. An assembler can easily clear faults and events using the keys on the keypad of the ICU to retrieve diagnostic information stored in the ICU and to reset faults.

Figure 9:
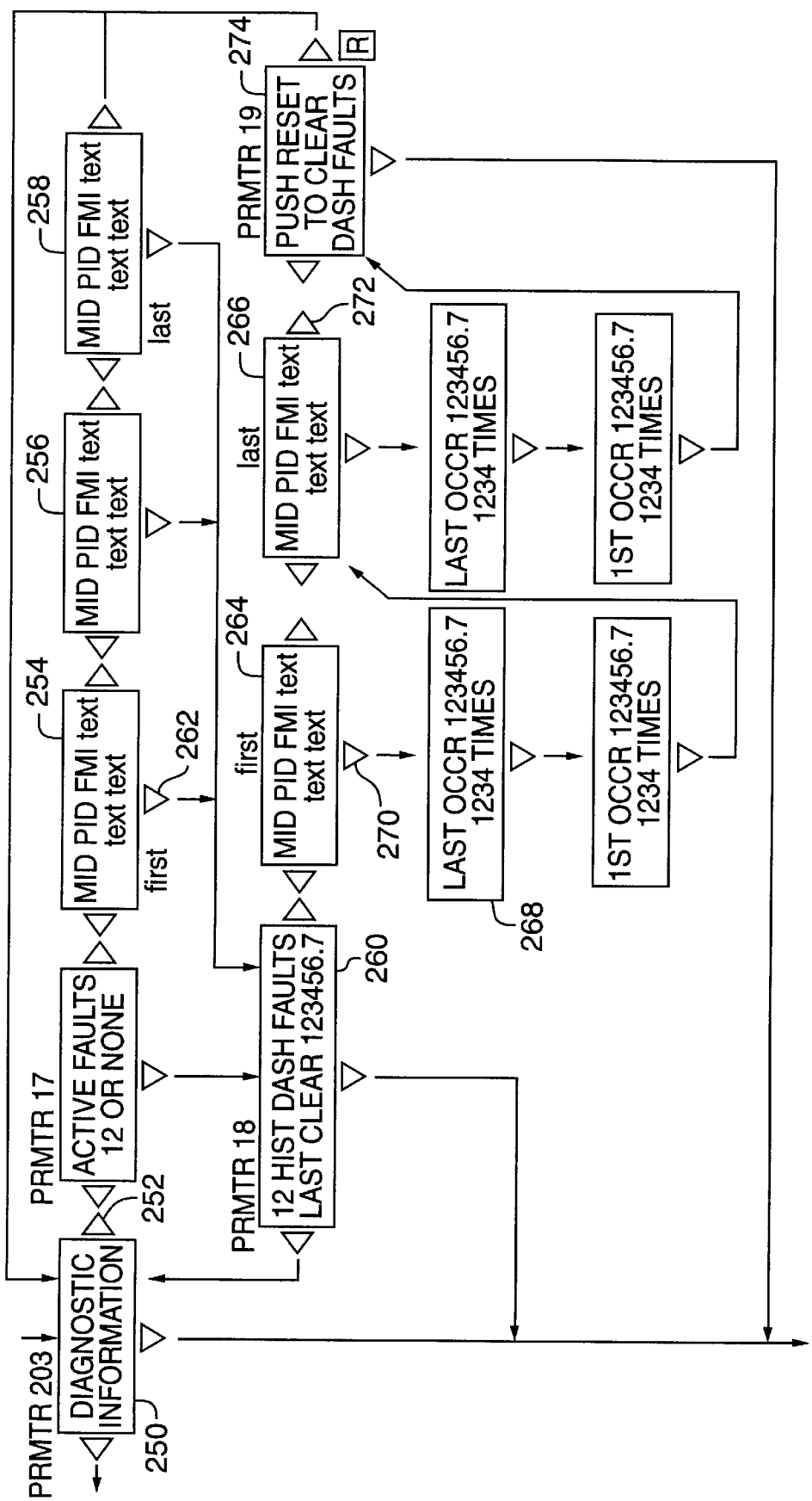
FIG. 9 is a diagram illustrating how the ICU can be used to reset electronics devices on a data link in a truck.

FIG. 9 is a diagram illustrating a sequence of displays presented by the ICU in response to user input during a method for clearing faults and events on board a truck. In this implementation, the user first has to access the diagnostic information screen. To accomplish this, power has to be applied to the vehicle and the parking brake has to be applied. It is not critical to the invention that the parking brake be applied during this operation. However, it is an additional safety feature implemented to prevent users from trying to access more detailed information while driving.

In this particular implementation shown in FIG. 9, the user scrolls through a variety of stationary access screens using the down arrow key on the keypad. One of the stationary access screens is referred to as "diagnostic information" (250).

Once the user has reached the diagnostic information screen (250), he can retrieve active faults by pressing the right arrow key (252). In general, an active fault is a fault where the condition generating the fault still exists, or in other words, is currently "active." An active fault is in contrast to a "historic" fault, which represents a fault that has occurred but is not currently active. In this implementation, the active faults include all of the active faults from the ECUs on the data link including the ICU. The fault screens show the message identifier (MID), parameter identifier (PID), and failure mode identifier (FMI), followed by an abbreviated description of each fault. If the user continues to press the right arrow key, he or she will scroll through the active faults (254–258).

At any point while viewing the active faults, the user can access historical faults 260 by depressing the down arrow key (262, for example) on the keypad. Using the left and right arrow keys, the user can scroll through each of the historic faults (264, 266). The historic fault screens show the MID, PID, FMI and possibly related text describing the fault. While viewing the historical faults, the user can obtain additional information about the occurrence of the fault such as when the fault occurred (268) and the number of times it occurred by pressing the down arrow key as shown (270, for example).

If the user presses the right arrow key after the last historic fault (272), a screen is displayed instructing the user how to clear all historic dash faults (274). If the user presses the reset key at this point, the ICU will interpret this request differently depending on whether a truck parameter is within predetermined limits. If the truck parameter, preferably mileage, is above the threshold value, the ICU will clear historic dash faults. The ICU will clear all events and historic faults for the ECUs on the data link only if the truck parameter is below a predefined threshold value. As an alternative to mileage, the engine hours or other measure (e.g., elapsed time, elapsed date) can be used to establish a threshold value.

To evaluate whether the threshold condition for the truck parameter is satisfied, the ICU retrieves the current value of the truck parameter and compares it with the threshold value. In this implementation, the powertrain ECU broadcasts the odometer reading periodically on the data link. The ICU reads the odometer reading from the data link and maintains its current value in memory. In response to a request to clear all dash faults, the ICU reads the current mileage reading from its memory and compares it with the threshold value. If it is below the threshold value, the ICU proceeds to construct messages to clear all faults and events on the truck's electronics. If it is above the threshold value, the ICU clears all of the historic dash faults.

If the engine hours are used as the truck parameter that establishes the threshold value, the ICU performs a similar function as described above. The ICU obtains the engine hours from the powertrain ECU, and compares the current value for engine hours with the threshold value. The ICU can obtain the engine hours either by specifically requesting the parameter from the powertrain ECU, or by listening for a periodic broadcast of the engine hours parameter. In the latter case, the powertrain ECU is programmed to broadcast the engine hours parameter.

The purpose for using either truck mileage or engine hours in these circumstances is to establish a limited mileage or time, in proximity to the manufacture of the truck, during which historic faults may be cleared or reset. Truck mileage and engine hours are candidates because they can be used to specify a limited period during which the reset feature is active within a reasonable proximity to the assembly of the truck.

Limiting the period during which this reset feature is active has a number of advantages. It enables all faults and events to be reset easily without requiring special purpose diagnostic tools to reset each of the ECUs separately. Because it is available for a limited duration in proximity to the truck's assembly, it can be used for the specific purpose of clearing faults erroneously generated during assembly. The limited duration of the reset feature precludes users from intentionally or inadvertently resetting faults that occur after the limited duration. This ensures that fault and event data will not be corrupted and that it will be available for servicing the truck.

In this embodiment, the truck parameter (either mileage or engine hours) is a programmable parameter stored in a configuration file in the ICU's memory. The value of the threshold can be established by setting its value in the configuration file. One way to edit the configuration file is to download a new version of the configuration file to the ICU from an external computer connected to the data link via the data port. Another way is to transfer a message to the ICU, instructing it to update the field in the configuration file that stores the threshold value.

In the specific implementation shown in FIG. 9, the programmable threshold value is represented by a parameter (parameter 19) in the configuration file associated with diagnostic message screen 274 as shown in FIG. 9. This parameter can be set at any integer value ranging from 0 to 255. This is only one specific example, and the manner in which the programmable threshold is maintained in the ICU can vary.

To clear the faults and events in this implementation, the ICU broadcasts a message on the data link instructing the ECUs to clear their faults. In this implementation, the ICU constructs a message with PID 195 to instruct the ECUs to clear their faults.

The specification for PID 195 is set forth below:

PID 195 - Diagnostic Data Request/Clear Count

Parameter Data Length: 3 Characters
Data Type: Binary Bit-Mapped
Resolution: Binary
Maximum Range: 0 to 255
Transmission Update Period: As needed
Message Priority: 8
Format: PID    Data

| | | |
|---|---|---|
| 195 | n a b c | |
| n | Number of parameter data characters = 3 | |
| a | MID of device to which request is directed | |
| b | SID or PID of a standard diagnostic code | |
| c | Diagnostic code character | |
| | Bits 8–7: | (00) - Request an ASCII descriptive message for the given SID or PID. |
| | | (01) - Request count be cleared for the given diagnostic code on the device with the given MID. |
| | | (10) - Request counts be cleared for all diagnostic codes on the device with the given MID. The diagnostic code given in this transmission is ignored. |
| | | (11) - Request additional diagnostic information for the given diagnostic code, the content of which is defined in a manufacturer's application document. |
| | Bit 6: | Type of diagnostic code<br>1 = standard diagnostic code<br>0 = reserved for expansion diagnostic codes |
| | Bit 5: | Low character identifier for a standard diagnostic code<br>1 = low character is subsystem identifier (SID)<br>0 = low character is parameter identifier (PID) |
| | Bits 4–1: | Failure mode identifier (FMI) of a standard diagnostic code |

In response to receiving PID 195 which includes an instruction to clear faults, the ECUs on the data link clear their historic faults.

The data logging unit clears any historic faults it has generated in response to PID 195, and clears any events in response to a another message instructing it to clear its stored events. In one implementation, the ICU builds a message specifically designed to clear stored events in the data logging unit. In response to this message, the data logging unit clears its stored events. For example, if a manually triggered event has been triggered, this event is cleared, the corresponding event file is cleared, and the data logging unit is reset.

The specific format of the message to clear stored events can vary. In one implementation, the message includes a MID of the transmitter (ICU, for example), the number 254, the MID of the data logging unit, the message length, the number 17, the event class, and a check sum. In this example, the event class parameter enables the data logging unit to clear events by classes. Clearing an event of a particular class causes the clearing of events in subordinate classes. For example, clearing class 1 events implicitly clears events in classes greater than 1 (classes 1, 2 and 3). Clearing class 2 events clears events in classes 2 and 3 but not in class 1. The data logging unit responds with the same message to acknowledge that the stored events have been cleared. If the data logging unit is unable to clear the requested events, the response message will indicate this by setting the event class parameter to zero.

The specific implementation of the diagnostic screens used to display and clear faults can vary. The ICU can be programmed to provide different diagnostic screens before and after the threshold value is attained. For example in one embodiment, the ICU displays diagnostic information based on whether the value of the truck parameter exceeds the threshold value. In response to a request to display fault information at diagnostic screen 250 in FIG. 9 for example, the ICU displays all active and historic faults, or only active and historic dash faults, depending on whether the truck parameter exceeds the threshold value. "Dash faults" in this context refer to the faults that the ICU can detect within its own subsystems and sensors. For example, a broken wire between the ICU and one of its sensors (such as sensors 94–104 shown in FIG. 2) constitutes a dash fault.

In one embodiment, the ICU determines which types of faults to display based on the comparison between the current value of the truck parameter and the threshold value. If the current value of the mileage parameter is below the threshold, for example, the ICU will display active and historic faults, including dash and non-dash faults, in response to user input as shown in FIG. 9. If the current value of the mileage parameter is beyond the threshold, the ICU will display only the active and historic dash faults.

In an alternative implementation, the ICU can be programmed to display all historic and active faults, whether or not the truck parameter exceeds the threshold. In this case, a user can scroll through display screens of all historic faults regardless of the value of the truck parameter, but he or she could only reset non-dash, historic faults before the truck parameter exceeds the threshold.

In addition to the specific approaches described above, there are a variety of alternative ways to implement the reset feature. As indicated above, the truck parameter can be based on engine hours instead of mileage, for example. The types of fault information (e.g. active and historic faults, dash faults or faults on all ECUs, etc.) and the format in which it is displayed (e.g., MID, PID, FMI) can vary as well.

While we have described the invention with reference to specific embodiments, we do not intend to limit the scope of our invention to these embodiments.

The electronic control units and the data link interconnecting them can be implemented in a variety of ways. For example, the data link based on SAE J1708 is one possible implementation. Other communication media and protocols can also be used to communicate messages between a control unit such as the instrumentation control unit and other electronic subsystems on a truck. The instrumentation control unit can also be implemented in a variety of ways. For example, there are a number of possible user interface designs including different display devices and display formats as well as different keypad or keyboard configurations.

Having described and illustrated the principles of our invention with reference to a preferred embodiment and several variations thereon, it should be apparent that the invention can be modified in arrangement and detail without departing from its principles. Accordingly, we claim all modifications as may come within the scope and spirit of the following claims.

We claim:

1. In a truck having a plurality of installed electronic control units coupled to a data link, a method for determining which electronic control units are installed on the truck, the method comprising:

from a computer coupled to the data link, issuing a request for data transmission on the data link;

monitoring the data link for responses from the installed electronic control units;

receiving the responses from the installed electronic control units;

interpreting identities of the installed electronic control units on the data link from the responses;

compiling a list of the installed electronic control units;

storing the list of the installed electronic control units;

comparing the list of the installed electronic control units with a list of expected electronic control units; and displaying information about missing or unknown electronic control units.

2. The method of claim 1 wherein the computer comprises an instrumentation control unit located in a cab of the truck;

wherein the instrumentation control unit is coupled to a display device; and wherein the displaying step includes displaying the information about the missing or unknown electronic control units on the display device.

3. The method of claim 2 further including:

downloading a file including the list of the installed electronic control units from memory of the instrumentation control unit to memory of an external computer coupled to the data link; and displaying the list of the installed electronic control units on a display device of the external computer.

4. The method of claim 1 wherein the computer comprises an external computer located outside the truck and coupled to the data link through a data port on the data link.

5. The method of claim 1 wherein the data link is a serial communication link.

6. The method of claim 1 wherein the step of issuing a request on the data link includes building a message listing one or more parameters to be returned by the installed electronic control units on the data link, and broadcasting the message on the data link.

7. The method of claim 6 wherein the message includes a first parameter to instruct the installed electronic control units to return a software identification parameter.

8. The method of claim 6 wherein the message includes a first parameter to instruct the installed electronic control units to return manufacturer and model parameters.

9. In a truck having a plurality of installed electronic control units coupled to a serial communication link, a method for determining the installed electronic control units, the method comprising:

from a instrumentation control unit located in a cab of the truck, constructing a message including an instruction to respond with diagnostic data;

broadcasting the message on the data link from the instrumentation control unit;

monitoring the data link for diagnostic data broadcast by the installed electronic control units in response to the message from the instrumentation control unit;

receiving the diagnostic data broadcast by the installed electronic control units;

interpreting identity of the installed electronic control units on the data link from the diagnostic data;

compiling a list of the installed electronic control units;

storing the list of the installed electronic control units in memory of the instrumentation control unit;

comparing the list of installed electronic control units with an expected list to identify missing and unknown electronic control units on the data link; and displaying information about the missing and unknown electronic control units on a display device coupled to the instrumentation control unit.

10. A method for resetting electronic control units coupled to a data link in a truck wherein the electronic control units include an instrumentation control unit with a display device and an input device located within a cab of the truck, the method comprising:

in response to a user request to display diagnostic data entered at the input device, displaying diagnostic data including a description of one or more faults from the electronic control units on the display device; and in response to a user request entered at the input device to clear a fault, determining whether mileage or engine hours are below a predefined value, and if so, instructing the electronic control units coupled to the data link to clear faults.

11. The method of claim 10 wherein one of the electronic control units comprises a data logging unit for monitoring and recording predefined events; and wherein the step of instructing the electronic control units to clear faults includes instructing the data logging unit to clear faults and a predefined event recorded in memory of the data logging unit.

12. A method of resetting a plurality of electronic control units in a truck, the electronic control units each being coupled to a data link in the truck, the method comprising:

establishing a reset threshold for a truck parameter;

determining whether the reset threshold for the truck parameter has been satisfied; and sending a reset signal along the data link when the reset threshold has been satisfied.

13. A method of claim 12 wherein the reset threshold is a predetermined truck mileage, and wherein the step of determining whether the reset threshold has been satisfied includes determining whether the truck mileage is below the predetermined truck mileage.

14. A method of claim 12 further including the step of displaying faults generated by the electronic control units in the truck in response to a first user request entered at a first electronic control unit; and wherein the determining step is performed in response to a second user request entered at the first electronic control unit.

15. A method for resetting electronic control units coupled to a data link in a truck wherein the electronic control units include an instrumentation control unit with a display device and an input device located within a cab of the truck, the method comprising:

in response to a user request to display diagnostic data entered at the input device, displaying diagnostic data including a description of one or more faults from the electronic control units on the display device;

in response to a user request entered at the input device to clear a fault, determining whether mileage is below a programmable value, including reading the value of the mileage from the data link, and comparing the value of the mileage with the programmable value;

if the mileage is below the programmable value, then constructing a message instructing the electronic control units coupled to the data link to clear all of their faults; and sending the message to the electronic control units over the data link.

* * * * *